US012717729B2

(12) United States Patent
Muralidhara et al.

(10) Patent No.: US 12,717,729 B2
(45) Date of Patent: Aug. 25, 2026

(54) OPTIMIZED PRIORITIZATION OF MEMORY ACCESSES

(71) Applicant: Intel Corporation, Santa Clara, CA (US)

(72) Inventors: Sai Prashanth Muralidhara, Portland, OR (US); Narasimha Sridhar Srirangam, Portland, OR (US); Rawan Abdel Khalek, San Francisco, CA (US); Yedidya Hilewitz, Sharon, MA (US); Daniel Liu, Concord, CA (US); Sharada Venkateswaran, San Francisco, CA (US); Wolf Witt, Mountain View, CA (US); Nishant Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/855,213

(22) Filed: Jun. 30, 2022

(65) Prior Publication Data

US 2024/0004808 A1 Jan. 4, 2024

(51) Int. Cl.
*G06F 13/18* (2006.01)
*G06F 13/16* (2006.01)

(52) U.S. Cl.
CPC ...... *G06F 13/1668* (2013.01); *G06F 13/1673* (2013.01); *G06F 13/18* (2013.01); *G06F 2213/16* (2013.01)

(58) Field of Classification Search
None
See application file for complete search history.

(56) References Cited

U.S. PATENT DOCUMENTS

| | | | | |
|---|---|---|---|---|
| 5,644,741 | A | 7/1997 | Bluhm et al. | |
| 5,649,174 | A | 7/1997 | Dockser | |
| 5,822,790 | A | 10/1998 | Mehrotra | |
| 6,427,202 | B1 | 7/2002 | Richardson et al. | |
| 6,947,047 | B1 | 9/2005 | Moy et al. | |
| 7,178,013 | B1 | 2/2007 | Batcher | |
| 9,372,811 | B2 * | 6/2016 | Ramrakhyani | G06F 12/126 |
| 10,223,298 | B2 * | 3/2019 | Chhabra | G06F 13/18 |
| 2001/0014932 | A1 * | 8/2001 | Suganuma | G06F 9/544 711/152 |
| 2002/0116662 | A1 | 8/2002 | Hofstee et al. | |
| 2003/0023836 | A1 | 1/2003 | Catherwood et al. | |
| 2003/0163679 | A1 | 8/2003 | Ganapathy et al. | |

(Continued)

OTHER PUBLICATIONS

Sair et al., "A Decoupled Predictor-Directed Stream Prefetching Architecture", IEEE Transactions on Computers, vol. 52, Issue 3, Mar. 2003, pp. 260-276, XP011095846.

*Primary Examiner* — Michael Sun
(74) *Attorney, Agent, or Firm* — Nicholson DeVos Webster & Elliott LLP

(57) ABSTRACT

Embodiments described herein may include apparatus, systems, techniques, or processes that are directed prioritizing memory requests from core processors such that some memory transaction requests receive a higher priority than other memory transaction requests. In some embodiments, queue lengths and latency, frequency of core demand transaction prioritization and the like are monitored and prioritization throttled accordingly. Other embodiments may be described and/or claimed.

19 Claims, 11 Drawing Sheets

(56) References Cited

U.S. PATENT DOCUMENTS

| | | | |
|---|---|---|---|
| 2003/0165147 | A1* | 9/2003 | Shimada ............. H04L 49/3081 370/428 |
| 2006/0179291 | A1 | 8/2006 | Di Gregorio |
| 2006/0294344 | A1 | 12/2006 | Hsu et al. |
| 2007/0113059 | A1 | 5/2007 | Tran |
| 2010/0042812 | A1 | 2/2010 | Hickey et al. |
| 2012/0260067 | A1 | 10/2012 | Henry et al. |
| 2014/0195744 | A1* | 7/2014 | Fleischer ............ G06F 13/1663 711/151 |
| 2016/0224349 | A1 | 8/2016 | Ge et al. |
| 2016/0342390 | A1 | 11/2016 | Giesselmann et al. |
| 2019/0163394 | A1* | 5/2019 | Loh ..................... G06F 12/0888 |
| 2019/0342205 | A1* | 11/2019 | Ur .......................... G06Q 20/20 |
| 2021/0326139 | A1 | 10/2021 | Gupta et al. |
| 2021/0357222 | A1 | 11/2021 | Nair et al. |
| 2021/0364571 | A1 | 11/2021 | Kurts et al. |
| 2021/0397454 | A1 | 12/2021 | Plotnikov et al. |
| 2022/0058023 | A1 | 2/2022 | Lemay et al. |
| 2022/0100520 | A1 | 3/2022 | Pokam et al. |
| 2022/0197808 | A1 | 6/2022 | Alam et al. |
| 2022/0206815 | A1 | 6/2022 | Wang et al. |
| 2022/0261509 | A1 | 8/2022 | LeMay et al. |
| 2022/0413715 | A1 | 12/2022 | LeMay et al. |
| 2022/0414010 | A1* | 12/2022 | Qiu ..................... G06F 12/0813 |
| 2023/0056699 | A1 | 2/2023 | Subramaniam et al. |
| 2023/0091205 | A1 | 3/2023 | Moga et al. |
| 2023/0195388 | A1 | 6/2023 | Butera et al. |

* cited by examiner 830
832
Branch Prediction
834
Instruction Cache
Instruction TLB
836
838
Instruction Fetch
840
Decode Circuitry
Front End Execution Engine
852
Rename / Allocator Unit
854
Retirement Unit
856
Scheduler(s)
858
Physical Register File(s)
860
864
862
Execution Unit(s) Circuitry
Memory Access Circuitry
Execution Cluster(s)
850

872
Memory Unit
Data TLB
Data Cache
L2 Cache
870
874
876

OPTIMIZED PRIORITIZATION OF MEMORY ACCESSES

TECHNICAL FIELD

Embodiments of the present disclosure generally relate to the field of computing, and in particular, to prioritization of memory accesses based on a source of a request.

BACKGROUND

A computing system typically has multiple levels of caches. When needed data is not found in a cache, memory (also referred to as system or main memory) is typically accessed. Accessing memory in a computing system is slower than accessing cache memory. When a core (also referred to as a processor, central processing unit (CPU), graphics processing unit (GPU) and the like) has to wait for instructions or data to be fetched from memory, a processor pipeline or execution unit may become stalled. A memory request that stalls current operations in the core may be referred to as a core demand memory access.

One solution to reduce the amount of processor stalling is to prefetch instructions and data, that is, accessing memory ahead of need based on an expectation that the instruction or data will be needed at a future time. Some computing systems are very aggressive in their data prefetch, sometimes using up significant amounts of memory bandwidth. This can be problematic when a core demand memory access does occur, potentially increasing the amount of time the core is stalled. While prefetching may be made less aggressive, this may minimize any advantages gained from prefetching.

A solution is needed that optimizes memory accesses while minimizing processor operation stalls.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
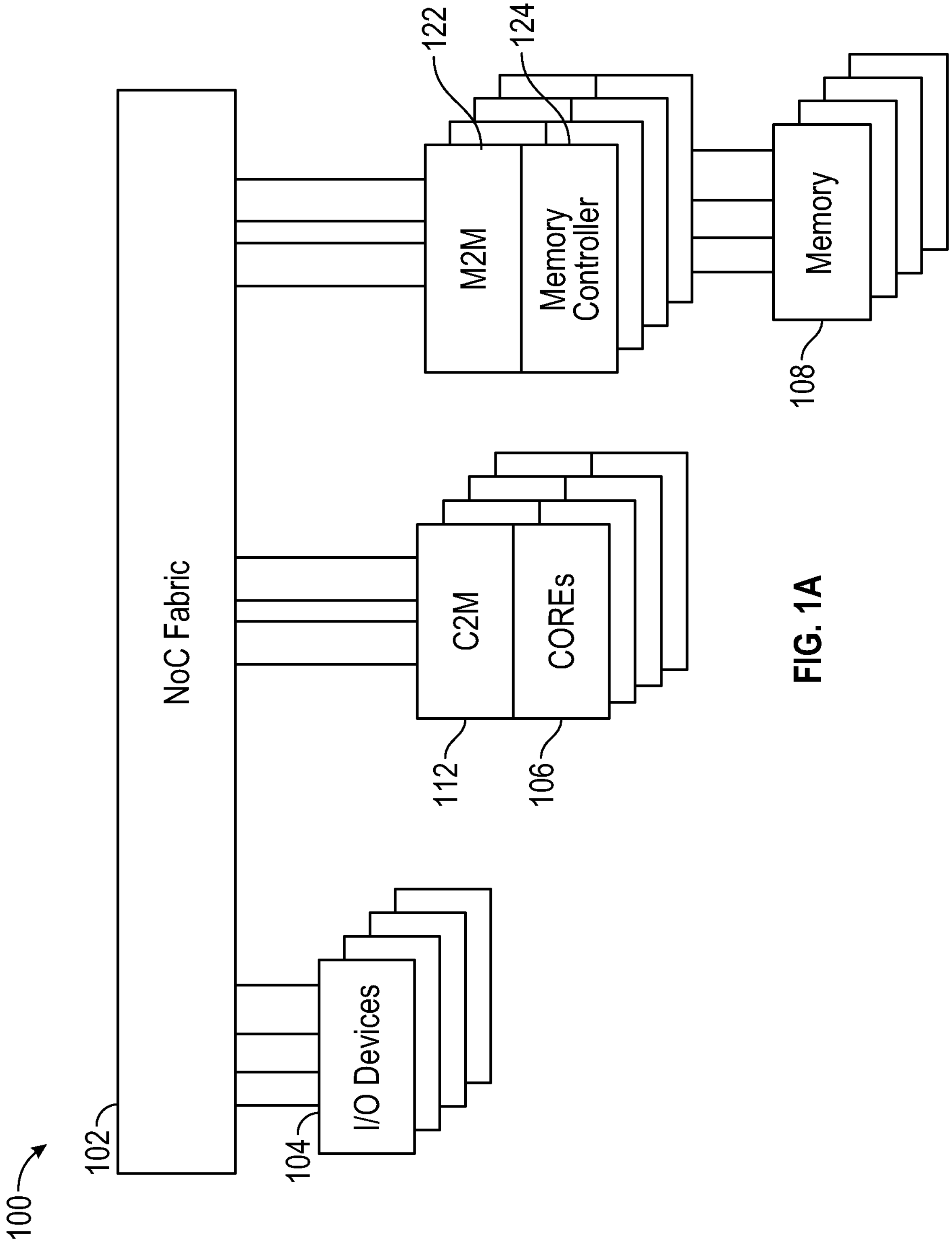
FIG. 1(A) illustrates a computing system in accordance with various embodiments.

Embodiments described herein may include apparatus, systems, techniques, and/or processes that are directed to optimization of memory accesses within a computing system. A memory controller is provided with information allowing a prioritization of core demand memory accesses over those of prefetch memory accesses and input/output (I/O) device memory accesses. By recognizing the source of the memory request, for example, from a core with a memory access request which missed in all caches, the memory controller may prioritize those requests, minimizing the time that a processor may wait for missing instructions or data. In some embodiments, source information includes an opcode in the request identifying a source such as an execution pipeline or prefetch unit, or alternatively a logical processor identifier. In some embodiments, the prioritization of core demand memory accesses and/or queue latencies may be monitored and if optimal, prioritization of core demand memory accesses may be scaled back.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" or "circuit" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1(A) illustrates a computing system in accordance with various embodiments. System 100 may be any type of computing platform, ranging from small portable devices such as smartphones, tablet computers and so forth to larger devices such as client systems, for example, desktop or workstation systems, server systems and so forth. System 100 includes a Network on a Chip (NoC) fabric through which one or more I/O devices 104 and one or more cores 106 communicate to a memory 108. Coupled to cores 106 are core-to-mesh (C2M) units 112. C2M units 112 operate to process requests from cores 106 for memory transactions and send corresponding transactions to memory 108. Circuitry within C2M units 112 identify the source of the memory transactions, for example, from an execution unit within cores 106 or a prefetch unit within cores 106. In some embodiments, source information includes an opcode in the request identifying a source such as an execution pipeline or prefetch unit, or alternatively a logical processor identifier. From this identification, C2M units 112 may prioritize those requests from the execution units over those from a prefetch unit. Such prioritization occurs by setting one or more prioritization bits in the corresponding memory transaction sent to memory 108. C2M units 112 may further process the memory transaction from the core, for example, by mapping a virtual address to a physical address, removing source information, and the like to generate the corresponding memory transaction sent to memory 108 through NoC fabric 102.

In an embodiment, each core 106 and a C2M 112 is a component of a system on a chip (SoC). In an embodiment, multiple cores 106 and one or more C2M 112 is a component of a SoC. In an embodiment, the majority of the components of system 100 are in a single package with multiple chips or multiple systems on a single chip (SoC).

A mesh to memory (M2M) unit 122 receives and processes received memory transactions from NoC fabric 102 for memory controller 124. These received memory transactions may originate from any of I/O devices 104 and cores 106 and possibly other devices not shown. Memory controller 124 controls memory accesses to memory 108. Memory 108 may be implemented as a shared virtual memory (SVM). In an embodiment, memory access controller 124 and M2M 122 is a component of a SoC. In an embodiment, memory 108, memory controller 124 and the M2M 122 are components of a SoC.

Examples of I/O devices 104 and cores 106 include, but are not limited to, central processing units (CPUs), graphic processing units (GPUs), various peripheral component interconnect express (PCIe) devices, virtual machines (VMs), processes, a phase-locked loop (PLL) unit, an input/output (I/O) unit, an application specific integrated circuit (ASIC) unit, a field-programmable gate array unit, a graphics card, a III-V unit, an accelerator, and a three-dimensional integrated circuit (3D IC). Note that some I/O devices 104 and/or Cores 106 may include a processor complex which may include one or more cores or processing engines.

While a configuration of system 100 has been described, alternative embodiments may have different configurations. While system 100 is described as including the components illustrated in FIG. 1, alternative embodiments may include additional components that facilitate the operation of system 100.

Figure 1B:
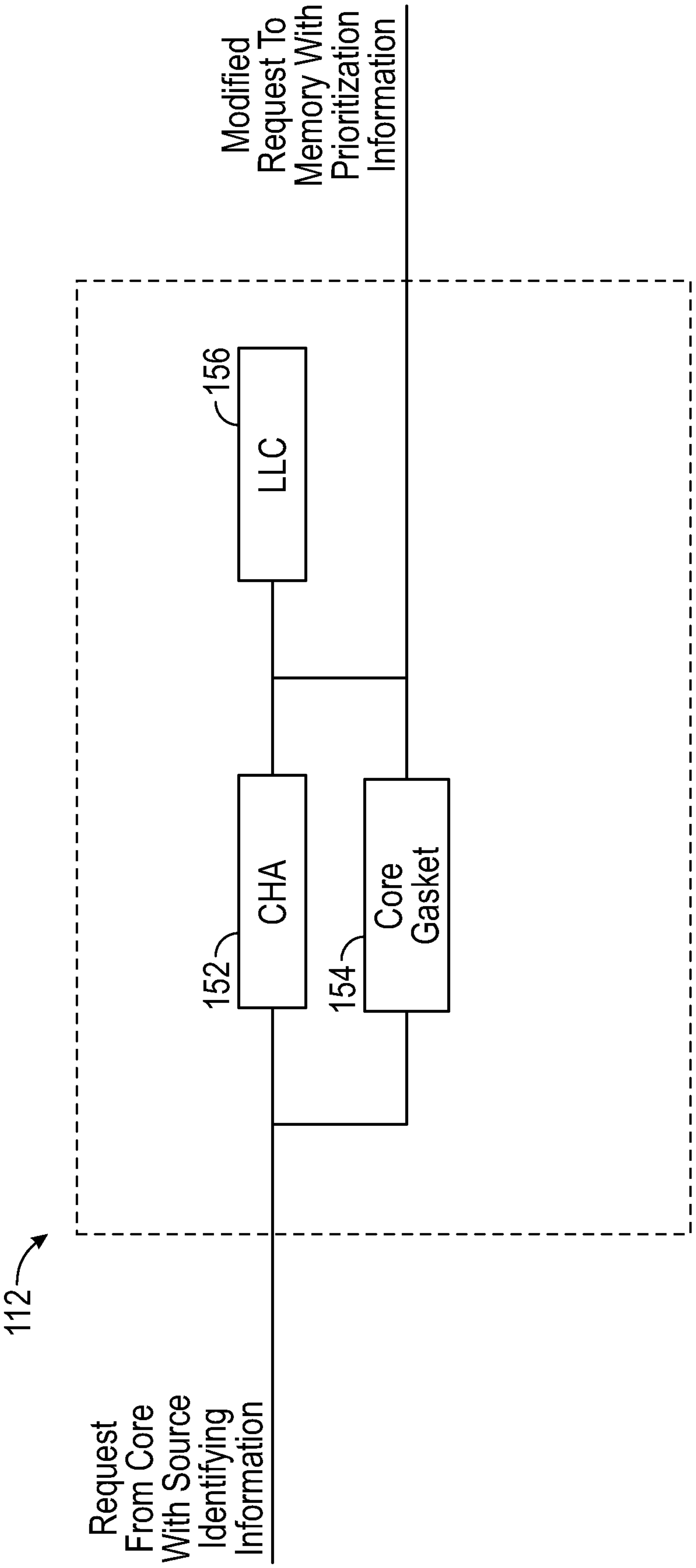
FIG. 1(B) illustrates a portion of a core to mesh (C2M) unit in accordance with some embodiments.

FIG. 1(B) is a diagram illustrating a portion of a core-to-mesh (C2M) unit in accordance with some embodiments. C2M unit 112 receives memory transaction requests from a processing core. The received memory transactions include information identifying the source of the request, for example, using an opcode or other such identifier received with the transaction request. The source information may identify, for example, whether the request is from an execution or pipeline unit or alternately from a prefetch unit inside the core. In some embodiments, source information includes an opcode in the request identifying a source such as an execution pipeline or prefetch unit, or alternatively a logical processor identifier. A request from a core execution/pipeline unit indicates the transaction is a core demand transaction, potentially causing a pipeline or other such stall within a processor.

The C2M unit 112 may include a caching and home agent (CHA) 152, a core gasket circuit 154 and a last level cache (LLC) 156. CHA 152 may also be referred to as a cache coherency controller. CHA 152 handles resolution of coherency across multiple processors, as well as snoop requests from processor cores and local and remote agents. Separate physical CHAs 152 are coupled to each core and LLC 156 to improve scalability according to the number of cores. LLC 156 is shared among multiple cores, the address space being interleaved across different CHAs and LLCs, which act like a single logical agent. Note that each of cores 212 and 222 may have one or more internal levels of caches not shared by other cores. A memory transaction request may be received by a CHA 152. If the requested information is not found in LLC 156, a cache miss occurs, and CHA 152 sets the priority information and sends the memory transaction request to memory.

Core gasket 154 may also receive the memory transaction request. If core gasket 154 predicts a cache miss in LLC 156, core gasket 154 similarly sets the priority information and sends the memory transaction to memory, saving the time needed for an LLC lookup. In both cases, CHA 152 or core gasket 154 sets the priority information by, for example, including information in the memory transaction setting the priority information to high priority if the source information indicates a core demand transaction. Other modifications to the memory request may be performed by C2M 112, including, for example, changing a virtual address to a physical address, removing source information, adding specific mesh requirements, and the like.

Figure 2:
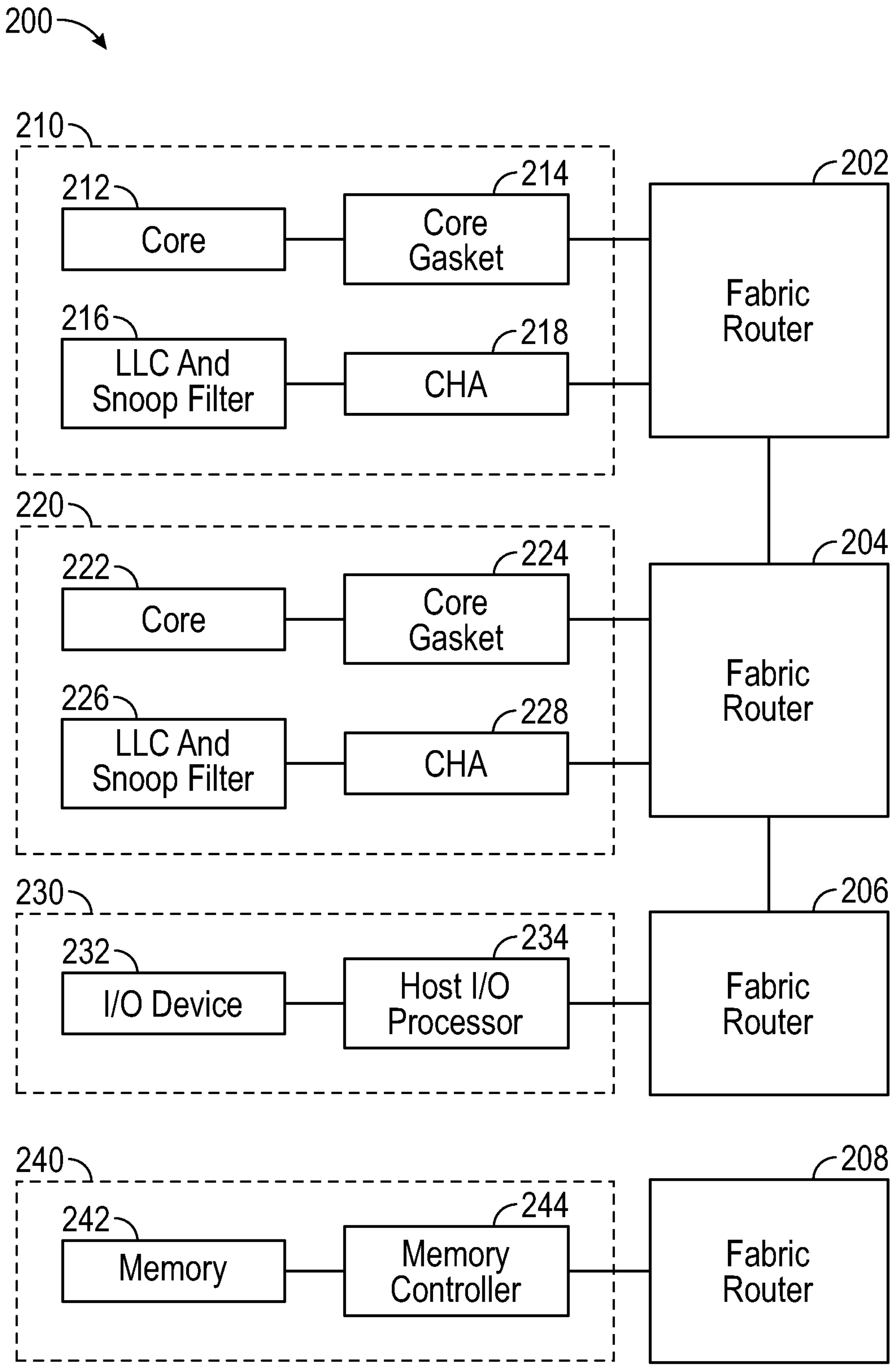
FIG. 2 illustrates another computing system in accordance with various embodiments.

FIG. 2 illustrates another computing system in accordance with various embodiments. System 200 may be any type of computing platform, ranging from small portable devices such as smartphones, tablet computers and so forth to larger devices such as client systems, for example, desktop or workstation systems, server systems and so forth. System 200 includes a series of fabric routers 202, 204, 206 and 208 used for system communications. Core circuit 210 communicates to the rest of system 200 through fabric routers 202-208. Core circuit 210 includes processing core 212 which communicates to fabric router 202 through core gasket 214. Core circuit 210 also includes a last level cache (LLC) and snoop filter 216 and cache and home agent (CHA) 218.

System 200 also includes another core circuit 220 with similar components: processing core 222, core gasket 224, LLC and snoop filter 226 and CHA 228. Although only two core circuits 210 and 220 are shown, system 200 may have less or more core circuit units. In some embodiments, core circuit 210 and 220 may have different configurations and components than that shown.

Core gasket 214 receives memory transaction requests from processing core 212. The received memory transaction requests include information identifying the source of the request, for example, using an opcode or other such identifier received with the transaction request. The source information may identify, for example, whether the request is from an execution or pipeline unit in processing core 212 or alternately from a prefetch unit in processing core 212. A request from a core execution/pipeline unit indicates the transaction is a core demand transaction, potentially causing a pipeline or other such stall within a processor if the memory transaction request is not processed quickly. In some embodiments, source information includes an opcode in the request identifying a source such as an execution pipeline or prefetch unit, or alternatively a logical processor identifier. According to some embodiments, core gasket 214 identifies high priority memory transaction requests based on the source information and marks them as a higher priority than other memory transaction requests. According to some embodiments, if core gasket 214 predicts a cache miss in LLC and snoop filter 216, core gasket 214 similarly sets the priority information and sends the memory transaction to memory, saving the time needed for an LLC lookup. Such prioritization occurs by setting one or more prioritizations bits in the corresponding memory transaction sent to memory 242 in memory circuit 240. Other modifications to the memory transaction request may be performed by core gasket 214, including, for example, changing a virtual address to a physical address, removing source information, adding specific mesh requirements, and the like.

CHA 218 handles resolution of coherency across multiple processing cores, including processing core 212, processing core 222 and the like. CHA 218 also snoops requests from processing cores and local and remote agents throughout system 200. Separate physical CHAs, such as CHA 218 and CHA 228 are coupled to each processing core and LLC and snoop filters throughout system 200 to improve scalability according to the number of processing cores. LLC and snoop filter 216 may be shared among multiple cores, the address space being interleaved across different CHAs and LLCs, which act like a single logical agent. The snoop filter portion of LLC and snoop filter 216 handles resolution of coherency across multiple processors, as well as snoop requests from processor cores and local and remote agents.

In some embodiments, system 200 includes input/output (I/O) circuit 230 including one or more I/O devices 232 coupled to fabric router 206 through one or more host I/O processors 234. In some embodiments, multiple I/O devices 232 are connected to fabric router 204 through a single host I/O processor 234. In some embodiments, multiple I/O devices 232 are connected to fabric router 206 via multiple host I/O processors 234.

System 200 includes a memory circuit unit 240 which includes a shared memory 242 accessible via memory controller 244 through fabric router 208. Although illustrated as a single block, multiple instances of memory circuit unit 240 may be distributed throughout system 200. Memory controller 244 receives and processes received memory transactions from fabric router 208. These received memory transactions may originate from any of I/O devices 232 and processing core 212, processing core 222, and possibly other devices not shown. Memory 242 may be implemented as a shared virtual memory (SVM).

Examples of I/O devices 232, processing core 212, and processing core 222 include but are not limited to CPUs, GPUs, various PCIe devices, VMs, processes, a phase-locked loop (PLL) unit, a I/O unit, a ASIC, a field-programmable gate array unit, a graphics card, a III-V unit, an accelerator, and a 3D IC. Note that some I/O devices 232 and/or processing core 212 and/or processing core 222 may include a processor complex which may include one or more cores or processing engines.

While a configuration of system 200 has been described, alternative embodiments may have different configurations. While system 200 is described as including the components illustrated in FIG. 2, alternative embodiments may include additional components that facilitate the operation of system 200.

Figure 3A:
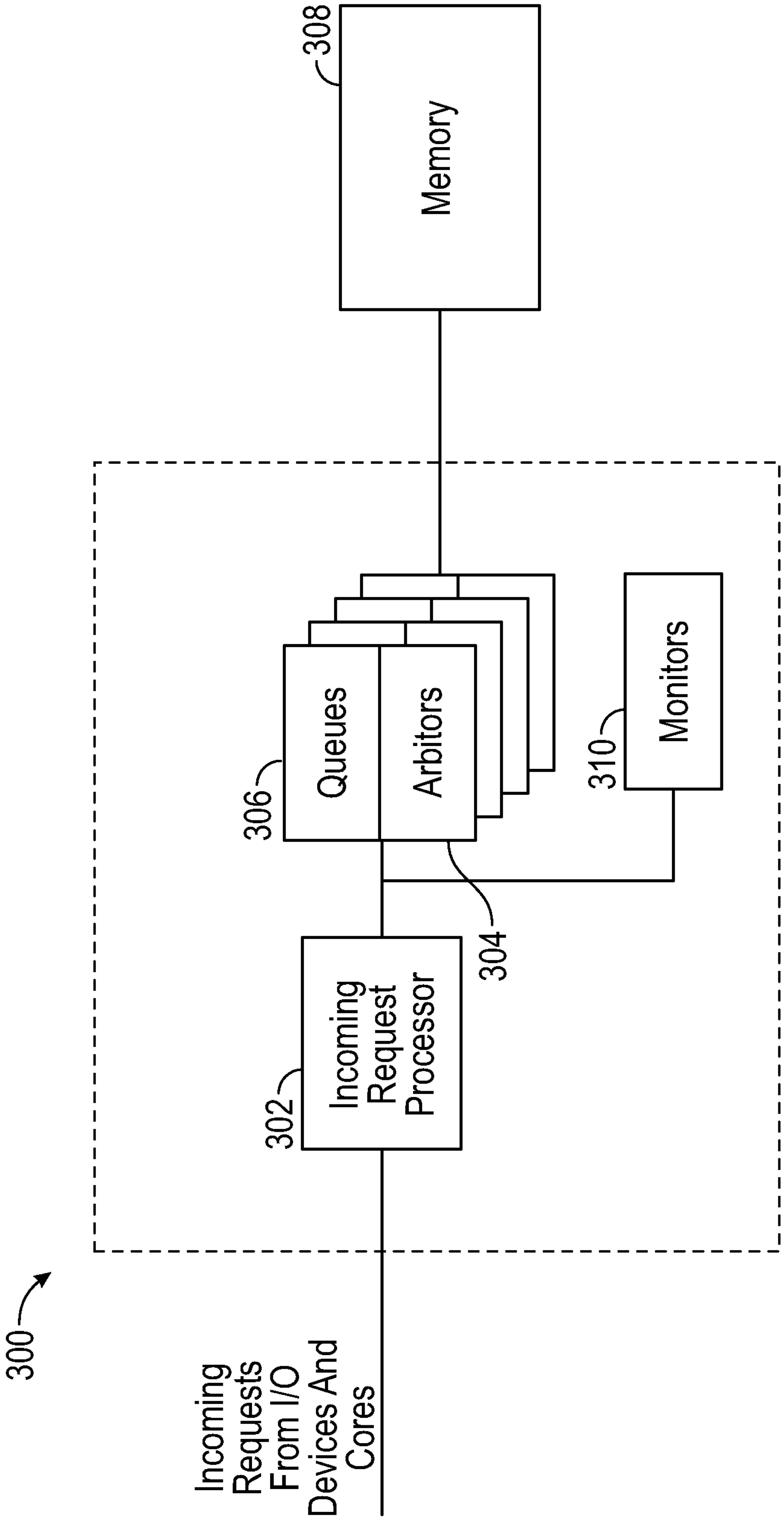
FIG. 3(A) illustrates a portion of a memory controller in accordance with some embodiments.

FIG. 3(A) illustrates a portion of a memory controller in accordance with some embodiments. The memory controller 300, as an example of memory controller 124 of FIG. 1, receives and processes memory transaction requests to memory 308, as an example of memory 108 of FIG. 1, from I/O devices and cores with an incoming request processor 302. Memory transaction requests are sorted/processed by arbitors 304 and stored in queues 306. Queues 306 may be multi-level allowing fine tuning of priorities of different memory transactions. For example, queues 306 may be linked serially to each other, with each arbitor 304 determining which transaction to forward to the next queue. Alternatively, queues 306 may be linked in a more complex pattern, allowing fine tuning of priority levels, such as critical, high, and medium priorities advancing transactions through queues 306 faster or slower than other transactions. Incoming request processor 302 determines if a transaction should be prioritized, notifying arbitors 304. During normal operations, monitors 310 monitor the latency within the queues, the number of prioritizations, and the like to determine the performance of memory accesses. Using thresholds or other such information, prioritization may be adjusted within the memory controller. For example, if core demand transactions become a bottleneck for other transactions, the memory controller may change prioritization levels, for example, moving transaction priorities from critical to high or even disabling prioritizations altogether.

Figure 3B:
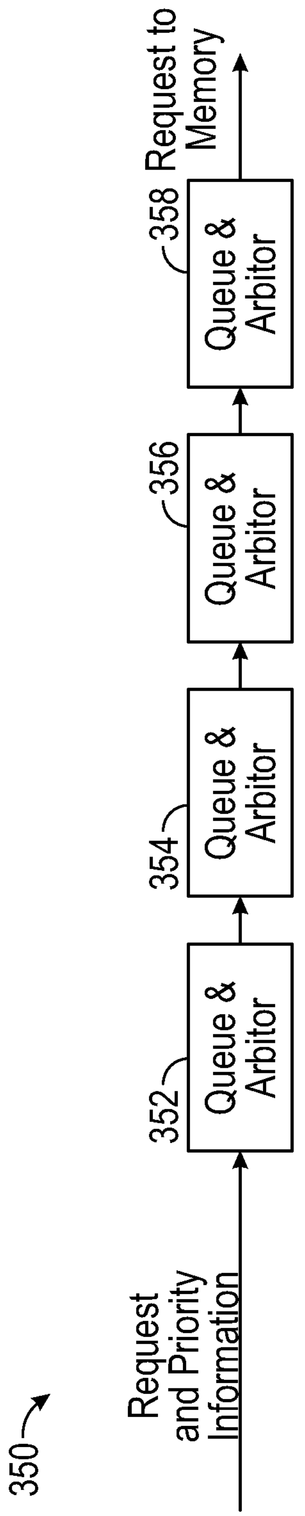
FIG. 3(B) illustrates a queuing unit architecture in accordance with some embodiments.

FIG. 3(B) illustrates a queuing architecture in accordance with some embodiments. As illustrated, queueing system 350 includes a series of queue & arbitor units 352, 354, 356 and 358 connected in a serial fashion. As a high priority request is received by queue and arbitor 352, queue and arbitor 352 will prioritize the movement of the memory transaction request to the next queue and arbitor 354 before other lower priority requests. As such, high priority requests move through the queuing system 350 faster than other lower priority requests.

Figure 3C:
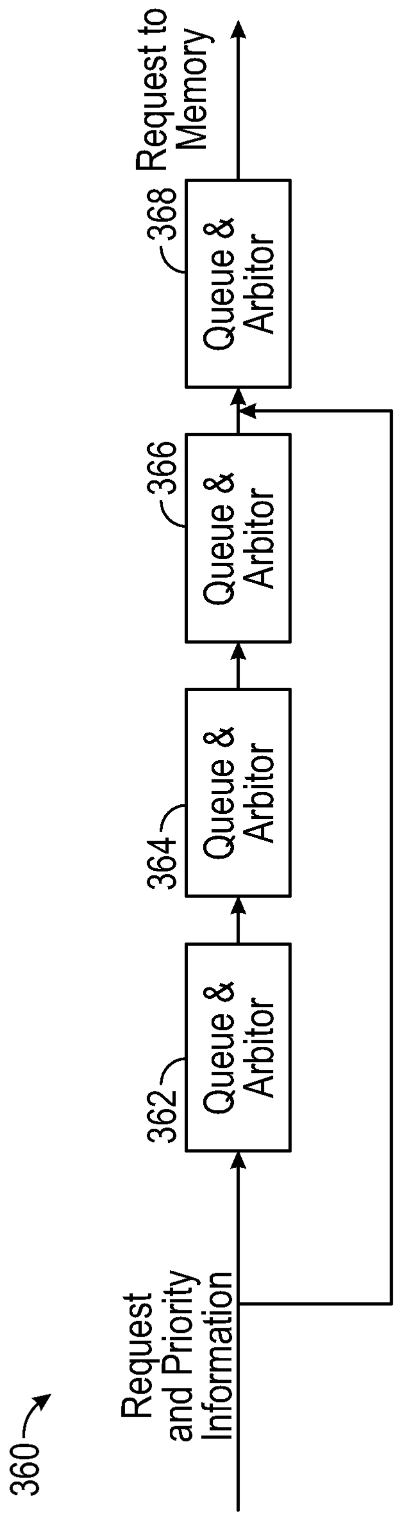
FIG. 3(C) illustrates another queuing unit architecture according to some embodiments.

FIG. 3(C) illustrates another queuing architecture according to some embodiments. As illustrated, queuing system 360 includes a series of queue & arbitor units 362, 364, 366 and 368 connected in a serial fashion. However, queuing system 360 may have additional paths to by-pass one or more queues. As illustrated, a high priority request may by-pass queue and arbitors 362, 364 and 366. As such, high priority requests move through the queuing system 360 faster than other lower priority requests.

Although queuing systems 350 and 360 illustrate two possible configurations to move higher priority requests faster, many alternative configurations may be used. For example, an entirely separate queue may be utilized for high priority requests or multiple by-pass paths may exist for varying levels of priority assigned to different requests.

Figure 4:
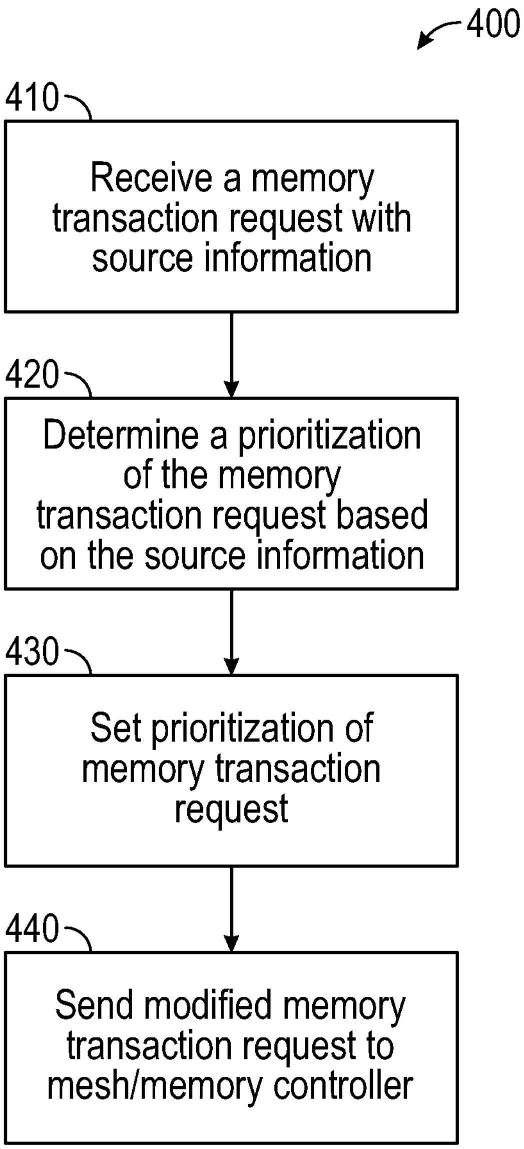
FIG. 4 illustrates a memory access prioritization operation in accordance with some embodiments.

FIG. 4 illustrates a memory access prioritization operation in accordance with some embodiments. Operation 400 is described as an operation of a core gasket circuit, however, alternate embodiments may be implemented differently and by other functional units. Memory transaction requests with source information are received, block 410. Such source information may be, for example, an opcode in the request identifying a source such as an execution pipeline or prefetch unit, or alternatively a logical processor identifier. A determination of the priority level of the memory transaction is made, block 420, based at least in part on the source information. A prioritization level is set in the memory transaction, block 430. Next, the modified memory transaction is sent to the fabric router or mesh fabric and ultimately to the memory controller, step 440. Note that the received memory transaction request may be different than the sent memory transaction request in other aspects, for example, the received memory transaction request may have a virtual address and the memory transaction request sent to memory controller may have a physical address. Other differences and changes to the memory transaction request may also occur between the received and sent operations.

Figure 5:
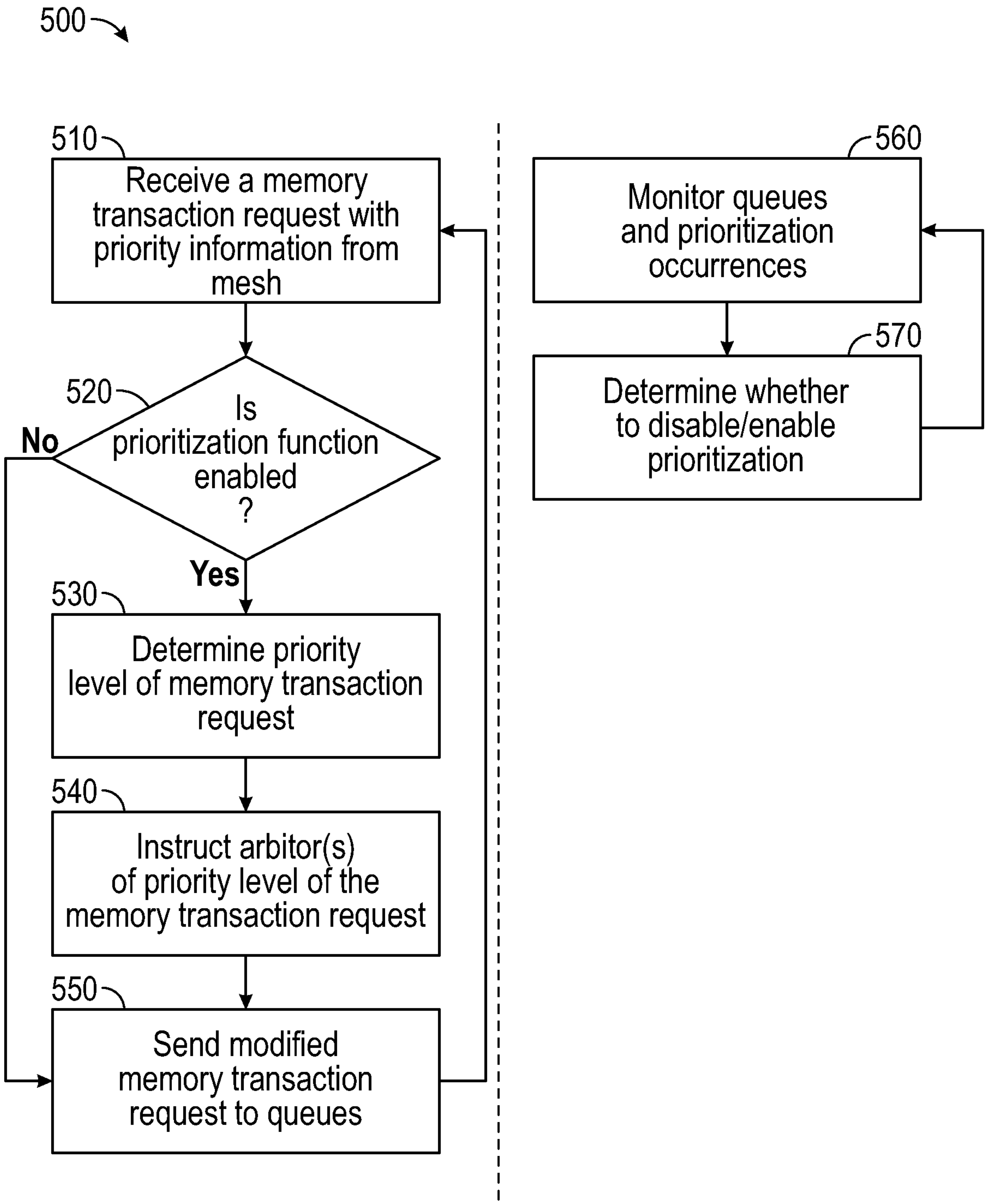
FIG. 5 illustrates a memory controller operation in accordance with some embodiments.

FIG. 5 is a diagram showing a memory controller operation in accordance with some embodiments. A memory transaction request with priority information is received by a memory controller from a mesh network, block 510. A determination is made whether prioritization functions are enabled, block 520. If not enabled, the memory transaction is sent to queueing circuitry awaiting being sent to memory, block 550. If enabled, the memory transaction request is processed to determine the priority level of the memory transaction request, block 530. In some embodiments, the priority levels may be simple, such as high or low priority. In alternate embodiments, the priority levels may be complex, such as critical, high, medium or low. The arbitors of the queues are instructed of the priority level of the memory transaction request, block 540 and the memory transaction request is sent to queueing circuitry awaiting being sent to memory, block 550. After sending a transaction to queueing circuitry, the memory controller returns to block 510 to continue to process incoming memory transactions, block 510. In alternate embodiments, operations may occur concurrently or in a different order, for example, checking the prioritization of a transaction, block 530, may occur concurrently or before determining if prioritization is enabled, block 520.

Concurrently with the memory controller operations 510-550, queues, prioritization occurrences and other performance metrics are monitored, block 560. From this data monitoring, whether to enable or disable the prioritization function are determined, block 570. For example, if high priority transactions become a bottleneck for other transactions, the memory controller may change prioritization levels, for example, moving transaction priorities from critical to high or even disabling prioritizations altogether.

In accordance with one embodiment, a priority function is enabled only when the bandwidth of the queue is below a high utilization level. At high bandwidths, when too many core demand or other transactions are prioritized, scheduling policies can lead to a decrease in bandwidth efficiency. Bandwidth bound workloads can lose performance to bandwidth efficiency loss as a result of a high number of prioritized transactions. Various threshold monitors may track the number of prioritized transactions, the bandwidth and latency overall of the queue and the like. Once a threshold has been met or exceeded, the occurrence of prioritization may be throttled higher or lower, alternately a prioritization function enabled or disabled.

Detailed below are examples of computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution circuitry as disclosed herein are generally suitable.

Figure 6:
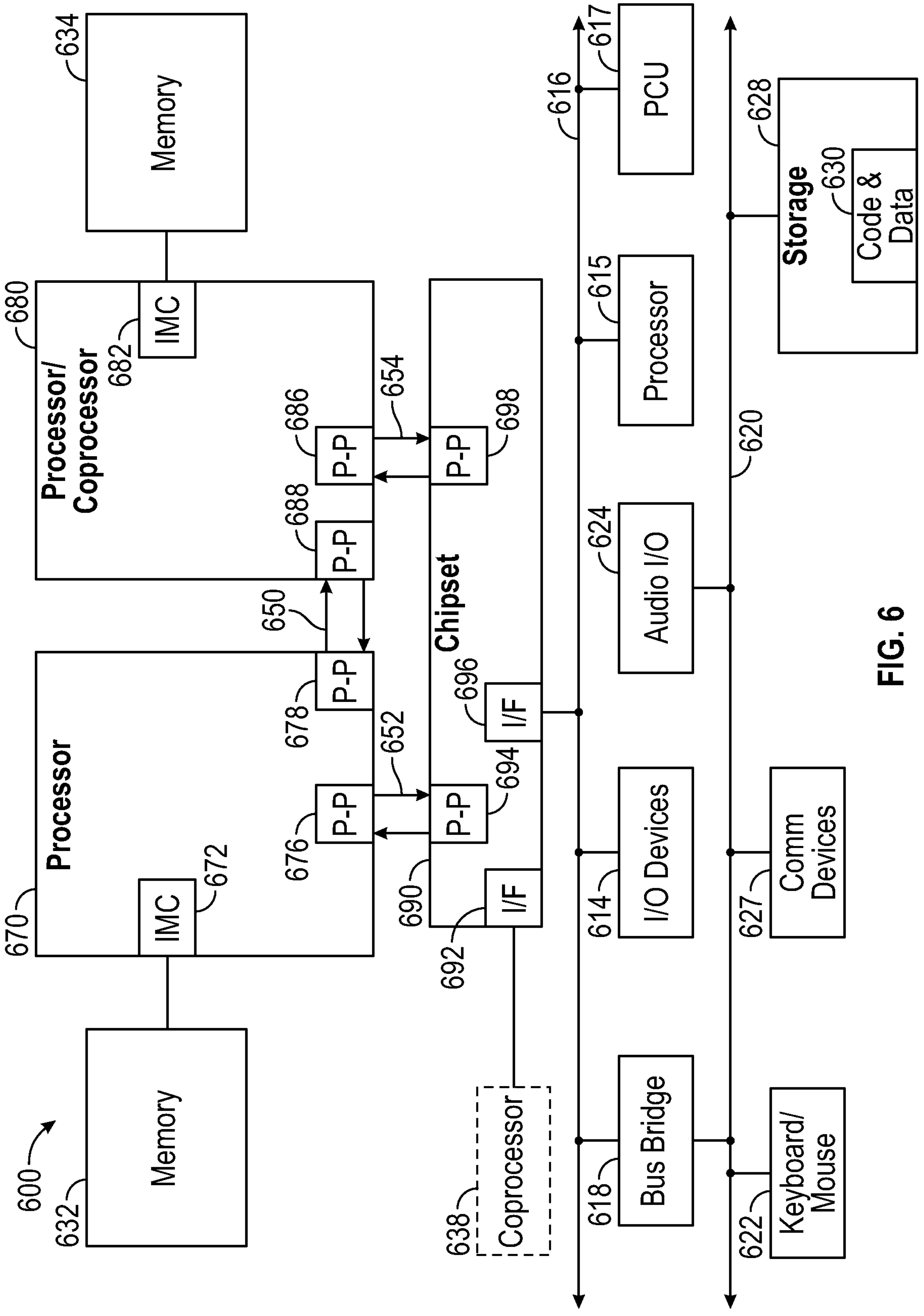
FIG. 6 illustrates another computing system in accordance with some embodiments.

FIG. 6 is a block diagram of a system in accordance with an embodiment. Multiprocessor system 600 is a point-to-point interconnect system and includes a plurality of processors including a first processor 670 and a second processor 680 coupled via a point-to-point interconnect 650. In some examples, the first processor 670 and the second processor 680 are homogeneous. In some examples, first processor 670 and the second processor 680 are heterogenous. Though system 600 is shown to have two processors, the system may have three or more processors, or may be a single processor system.

Processors 670 and 680 are shown including integrated memory controller (IMC) circuitry 672 and 682, respectively. Processor 670 also includes as part of its interconnect controller point-to-point (P-P) interfaces 676 and 678; similarly, second processor 680 includes P-P interfaces 686 and 688. Processors 670, 680 may exchange information via the point-to-point (P-P) interconnect 650 using P-P interface circuits 678, 688. IMCs 672 and 682 couple the processors 670, 680 to respective memories, namely a memory 632 and a memory 634, which may be portions of main memory locally attached to the respective processors.

Processors 670, 680 may each exchange information with a chipset 690 via individual P-P interconnects 652, 654 using point to point interface circuits 676, 694, 686, 698. Chipset 690 may optionally exchange information with a coprocessor 638 via an interface 692. In some examples, the coprocessor 638 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 670, 680 or outside of both processors, yet connected with the processors via P-P interconnect, such that either or both processors' local cache information may be stored in the shared cache if a processor is placed into a low power mode.

Chipset 690 may be coupled to a first interconnect 616 via an interface 696. In some examples, first interconnect 616 may be a Peripheral Component Interconnect (PCI) interconnect, or an interconnect such as a PCI Express interconnect or another I/O interconnect. In some examples, one of the interconnects couples to a power control unit (PCU) 617, which may include circuitry, software, and/or firmware to perform power management operations with regard to the processors 670, 680 and/or co-processor 638. PCU 617 provides control information to a voltage regulator (not shown) to cause the voltage regulator to generate the appropriate regulated voltage. PCU 617 also provides control information to control the operating voltage generated. In various examples, PCU 617 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 617 is illustrated as being present as logic separate from the processor 670 and/or processor 680. In other cases, PCU 617 may execute on a given one or more of cores (not shown) of processor 670 or 680. In some cases, PCU 617 may be implemented as a microcontroller (dedicated or general-purpose) or other control logic configured to execute its own dedicated power management code, sometimes referred to as P-code. In yet other examples, power management operations to be performed by PCU 617 may be implemented externally to a processor, such as by way of a separate power management integrated circuit (PMIC) or another component external to the processor. In yet other examples, power management operations to be performed by PCU 617 may be implemented within BIOS or other system software.

Various I/O devices 614 may be coupled to first interconnect 616, along with a bus bridge 618 which couples first interconnect 616 to a second interconnect 620. In some examples, one or more additional processor(s) 615, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 616. In some examples, second interconnect 620 may be a low pin count (LPC) interconnect. Various devices may be coupled to second interconnect 620 including, for example, a keyboard and/or mouse 622, communication devices 627 and a storage circuitry 628. Storage circuitry 628 may be one or more non-transitory machine-readable storage media as described below, such as a disk drive or other mass storage device which may include instructions/code and data 630 in some examples. Further, an audio I/O 624 may be coupled to second interconnect 620. Note that other architectures than the point-to-point architecture described above are possible. For example, instead of the point-to-point architecture, a system such as multiprocessor system 600 may implement a multi-drop interconnect or other such architecture.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computing system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Examples of core architectures are described next, followed by descriptions of various processors and computer architectures.

Figure 7:
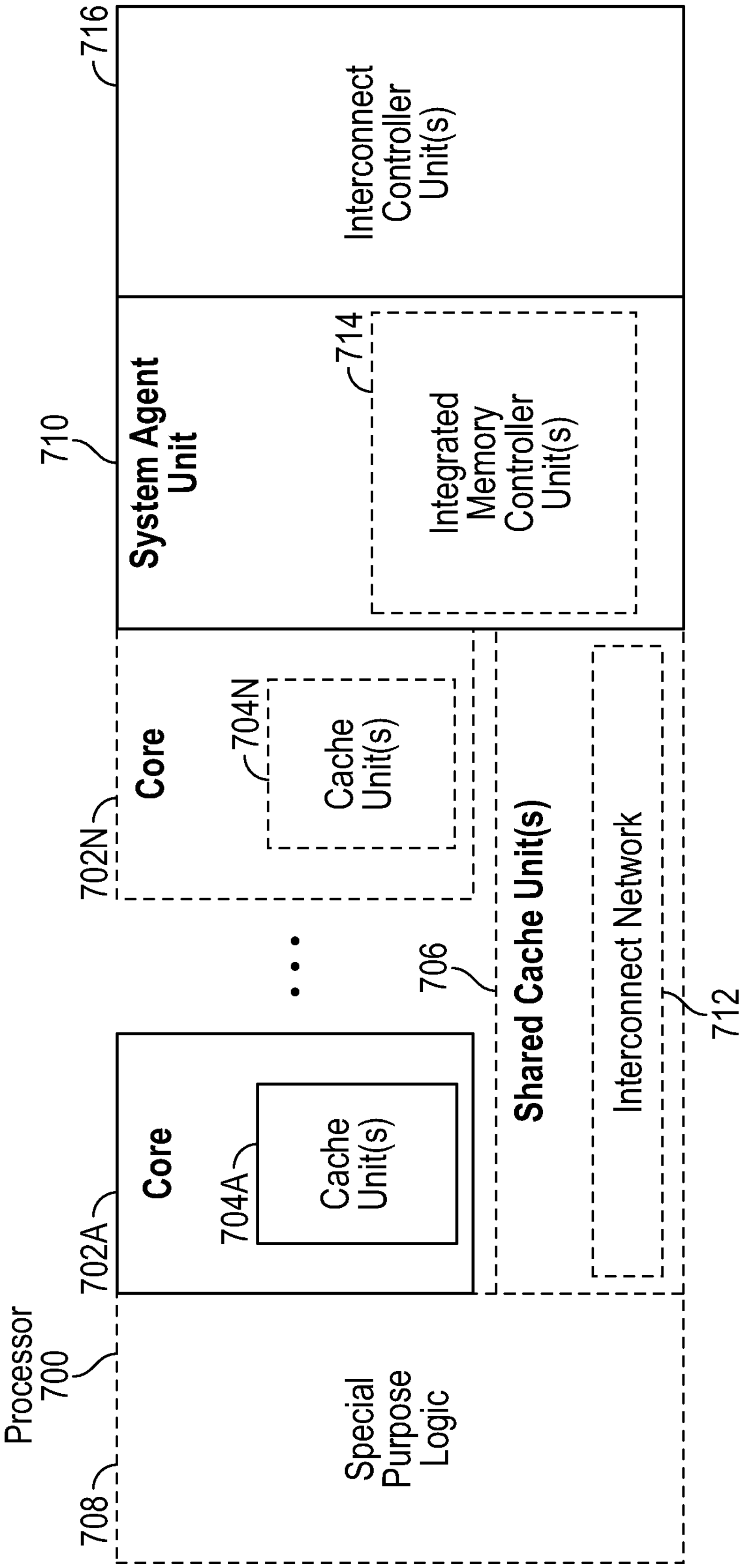
FIG. 7 illustrates an example processor that may have more than one core and an integrated memory controller.

FIG. 7 is a block diagram of an example processor that may have more than one core and an integrated memory controller. The solid lined boxes illustrate a processor 700 with a single core 702A, a system agent unit circuitry 710, a set of one or more interconnect controller unit(s) circuitry 716, while the optional addition of the dashed lined boxes illustrates an alternative processor 700 with multiple cores 702(A)-(N), a set of one or more integrated memory controller unit(s) circuitry 714 in the system agent unit circuitry 710, and special purpose logic 708, as well as a set of one or more interconnect controller units circuitry 716. Note that the processor 700 may be one of the processors 670 or 680, or co-processor 638 or 615 of FIG. 6.

Thus, different implementations of the processor 700 may include: 1) a CPU with the special purpose logic 708 being integrated graphics and/or scientific (throughput) logic (which may include one or more cores, not shown), and the cores 702(A)-(N) being one or more general purpose cores (e.g., general purpose in-order cores, general purpose out-of-order cores, or a combination of the two); 2) a coprocessor with the cores 702(A)-(N) being a large number of special purpose cores intended primarily for graphics and/or scientific (throughput); and 3) a coprocessor with the cores 702(A)-(N) being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 704(A)-(N) within the cores 702(A)-(N), a set of one or more shared cache unit(s) circuitry 706, and external memory (not shown) coupled to the set of integrated memory controller unit(s) circuitry 714. The set of one or more shared cache unit(s) circuitry 706 may include one or more mid-level caches, such as level 2 (L2), level 3 (L3), level 4 (L4), or other levels of cache, such as a last level cache (LLC), and/or combinations thereof. While in some examples ring-based interconnect network circuitry 712 interconnects the special purpose logic 708 (e.g., integrated graphics logic), the set of shared cache unit(s) circuitry 706, and the system agent unit circuitry 710, alternative examples use any number of well-known techniques for interconnecting such units. In some examples, coherency is maintained between one or more of the shared cache unit(s) circuitry 706 and cores 702(A)-(N).

In some examples, one or more of the cores 702(A)-(N) are capable of multi-threading. The system agent unit circuitry 710 includes those components coordinating and operating cores 702(A)-(N). The system agent unit circuitry 710 may include, for example, power control unit (PCU) circuitry and/or display unit circuitry (not shown). The PCU may be or may include logic and components needed for regulating the power state of the cores 702(A)-(N) and/or the special purpose logic 708 (e.g., integrated graphics logic). The display unit circuitry is for driving one or more externally connected displays.

The cores 702(A)-(N) may be homogenous in terms of instruction set architecture (ISA). Alternatively, the cores 702(A)-(N) may be heterogeneous in terms of ISA; that is, a subset of the cores 702(A)-(N) may be capable of executing an ISA, while other cores may be capable of executing only a subset of that ISA or another ISA.

Figure 8A:
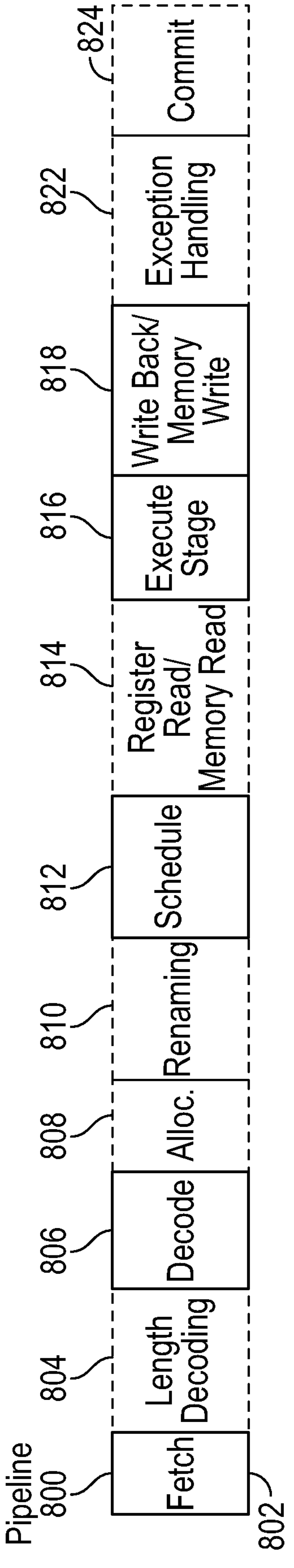
FIG. 8(A) illustrates both an in-order pipeline and register renaming, out-of-order issue/execution pipeline in accordance with some embodiments.

FIG. 8(A) is a block diagram illustrating both an in-order pipeline and register renaming, out-of-order issue/execution pipeline in accordance with some embodiments.

Figure 8B:
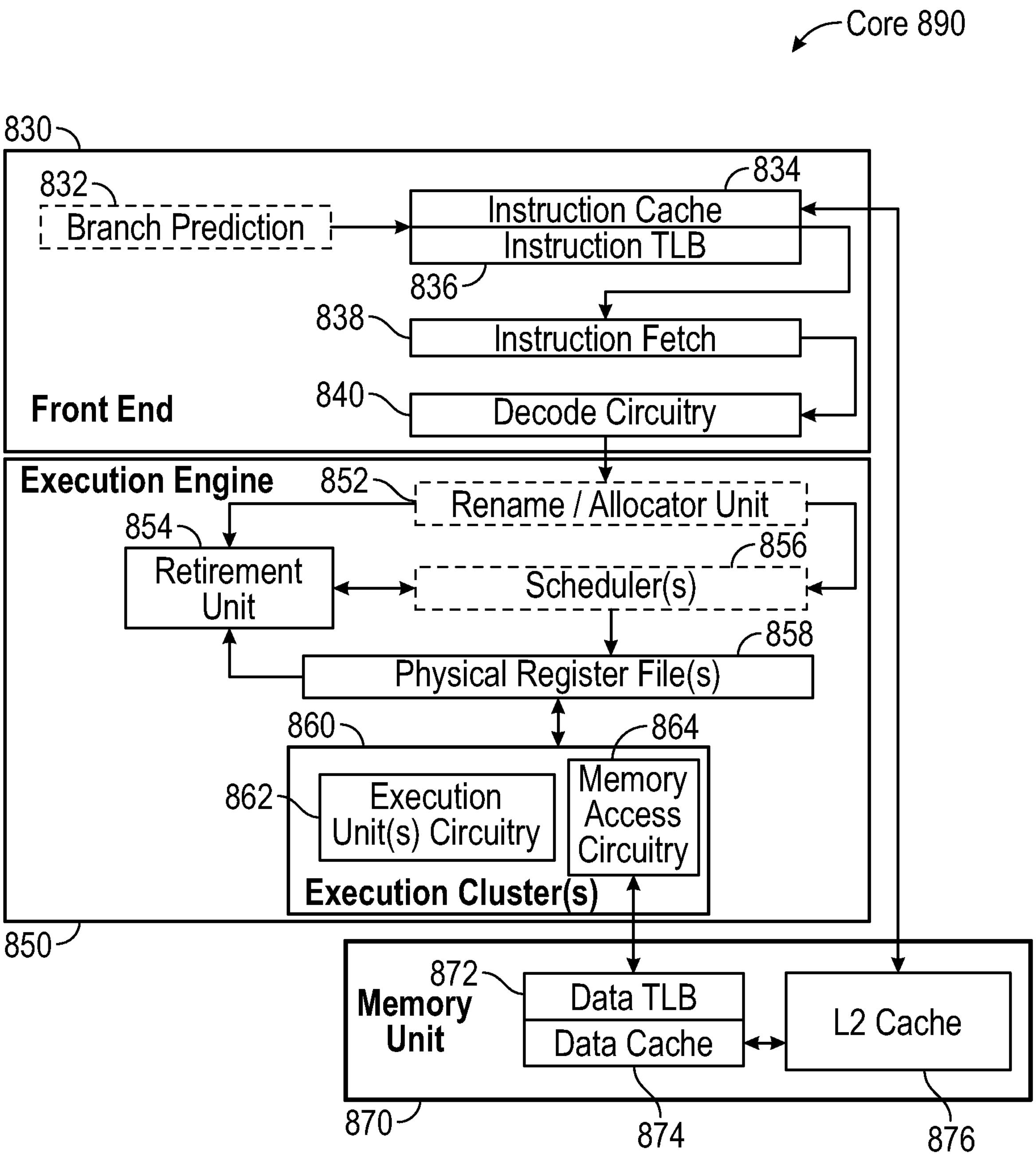
FIG. 8(B) illustrates both an in-order architecture core and an out-of-order issue/execution architecture core to be including in a processor in accordance with some embodiments.

FIG. 8(B) is a block diagram illustrating both an example of an in-order architecture core and a register renaming, out-of-order issue/execution architecture core to be included in a processor according to examples. The solid lined boxes in FIGS. 8(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8(A), a processor pipeline 800 includes a fetch stage 802, an optional length decoding stage 804, a decode stage 806, an optional allocation (Alloc) stage 808, an optional renaming stage 810, a schedule (also known as a dispatch or issue) stage 812, an optional register read/memory read stage 814, an execute stage 816, a write back/memory write stage 818, an optional exception handling stage 822, and an optional commit stage 824. One or more operations can be performed in each of these processor pipeline stages. For example, during the fetch stage 802, one or more instructions are fetched from instruction memory, and during the decode stage 806, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 806 and the register read/memory read stage 814 may be combined into one pipeline stage. In one example, during the execute stage 816, the decoded instructions may be executed, LSU address/data pipelining to an Advanced Microcontroller Bus (AMB) interface may be performed, multiply and add operations may be performed, arithmetic operations with branch results may be performed, etc.

By way of example, the register renaming, out-of-order issue/execution architecture core of FIG. 8(B) may implement the pipeline 800 as follows: 1) the instruction fetch circuitry 838 performs the fetch and length decoding stages 802 and 804; 2) the decode circuitry 840 performs the decode stage 806; 3) the rename/allocator unit circuitry 852 performs the allocation stage 808 and renaming stage 810; 4) the scheduler(s) circuitry 856 performs the schedule stage 812; 5) the physical register file(s) circuitry 858 and the memory unit circuitry 870 perform the register read/memory read stage 814; the execution cluster(s) 860 perform the execute stage 816; 6) the memory unit circuitry 870 and the physical register file(s) circuitry 858 perform the write back/memory write stage 818; 7) various circuitry may be involved in the exception handling stage 822; and 8) the retirement unit circuitry 854 and the physical register file(s) circuitry 858 perform the commit stage 824.

FIG. 8(B) is a block diagram illustrating both an in-order architecture core and an out-of-order issue/execution architecture core to be including in a processor in accordance with some embodiments. FIG. 8(B) shows a processor core 890 including front-end unit circuitry 830 coupled to an execution engine unit circuitry 850, and both are coupled to a memory unit circuitry 870. The core 890 may be a reduced instruction set architecture computing (RISC) core, a complex instruction set architecture computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit circuitry 830 may include branch prediction circuitry 832 coupled to an instruction cache circuitry 834, which is coupled to an instruction translation lookaside buffer (TLB) 836, which is coupled to instruction fetch circuitry 838, which is coupled to decode circuitry 840. In one example, the instruction cache circuitry 834 is included in the memory unit circuitry 870 rather than the front-end circuitry 830. The decode circuitry 840 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 840 may further include an address generation unit (AGU, not shown) circuitry. In one example, the AGU generates an LSU address using forwarded register ports, and may further perform branch forwarding (e g, immediate offset branch forwarding, LR register branch forwarding, etc.). The decode circuitry 840 may be implemented using various different mechanisms. Examples of suitable mechanisms include, but are not limited to, look-up tables, hardware implementations, programmable logic arrays (PLAs), microcode read only memories (ROMs), etc. In one example, the core 890 includes a microcode ROM (not shown) or other medium that stores microcode for certain macroinstructions (e.g., in decode circuitry 840 or otherwise within the front end circuitry 830). In one example, the decode circuitry 840 includes a micro-operation (micro-op) or operation cache (not shown) to hold/cache decoded operations, micro-tags, or micro-operations generated during the decode or other stages of the processor pipeline 800. The decode circuitry 840 may be coupled to rename/allocator unit circuitry 852 in the execution engine circuitry 850.

The execution engine circuitry 850 includes the rename/allocator unit circuitry 852 coupled to a retirement unit circuitry 854 and a set of one or more scheduler(s) circuitry 856. The scheduler(s) circuitry 856 represents any number of different schedulers, including reservations stations, central instruction window, etc. In some examples, the scheduler(s) circuitry 856 can include arithmetic logic unit (ALU)

scheduler/scheduling circuitry, ALU queues, arithmetic generation unit (AGU) scheduler/scheduling circuitry, AGU queues, etc. The scheduler(s) circuitry 856 is coupled to the physical register file(s) circuitry 858. Each of the physical register file(s) circuitry 858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 858 includes vector registers unit circuitry, writemask registers unit circuitry, and scalar register unit circuitry. These register units may provide architectural vector registers, vector mask registers, general-purpose registers, etc. The physical register file(s) circuitry 858 is coupled to the retirement unit circuitry 854 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 854 and the physical register file(s) circuitry 858 are coupled to the execution cluster(s) 860. The execution cluster(s) 860 includes a set of one or more execution unit(s) circuitry 862 and a set of one or more memory access circuitry 864. The execution unit(s) circuitry 862 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 856, physical register file(s) circuitry 858, and execution cluster(s) 860 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 864). It should also be understood that where separate pipelines are used, one or more of these pipelines may be out-of-order issue/execution and the rest in-order.

In some examples, the execution engine unit circuitry 850 may perform load store unit (LSU) address/data pipelining to an Advanced Microcontroller Bus (AMB) interface (not shown), and address phase and writeback, data phase load, store, and branches.

The set of memory access circuitry 864 is coupled to the memory unit circuitry 870, which includes data TLB circuitry 872 coupled to a data cache circuitry 874 coupled to a level 2 (L2) cache circuitry 876. In one example, the memory access circuitry 864 may include a load unit circuitry, a store address unit circuit, and a store data unit circuitry, each of which is coupled to the data TLB circuitry 872 in the memory unit circuitry 870. The instruction cache circuitry 834 is further coupled to the level 2 (L2) cache circuitry 876 in the memory unit circuitry 870. In one example, the instruction cache 834 and the data cache 874 are combined into a single instruction and data cache (not shown) in L2 cache circuitry 876, a level 3 (L3) cache circuitry (not shown), and/or main memory. The L2 cache circuitry 876 is coupled to one or more other levels of cache and eventually to a main memory.

The core 890 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 890 includes logic to support a packed data instruction set architecture extension (e.g., AVX1, AVX2), thereby allowing the operations used by many multimedia applications to be performed using packed data.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

The following examples pertain to further embodiments.

An example may be a system, comprising a memory; core circuit communicatively coupled to the memory, the core circuit comprising: a processing core; and a core gasket circuit to receive a memory transaction request from the processing core, the memory transaction request including source information identifying a source of the memory transaction request, the core gasket circuit further to determine and set a priority level of the memory transaction request based at least in part on the source information, the core gasket circuit further to send the memory transaction request with the priority level to the memory.

In an example, the source information comprises an opcode identifying the source of the memory transaction request as one of a prefetch unit in the processing core and an execution pipeline in the processing core.

In an example, the core gasket circuit is to assign a higher priority to a memory transaction request from the execution pipeline than a memory transaction request from the prefetch unit.

In an example, the source information comprises a logical processor identification.

In an example, the system further comprising a memory controller to receive the memory transaction request with the priority level; and if a prioritization function in the memory controller is enabled, to schedule the memory transaction request with the priority level to be sent to the memory according to the priority level.

In an example, the memory controller comprising at least one queue and at least one arbitor, the at least one arbitor to schedule higher priority memory transaction requests to exit the queue before lower priority memory transaction requests.

In an example, the memory controller comprising multiple queues coupled serially, the memory controller to cause the higher priority memory transaction requests to by-pass one or more of the multiple queues.

In an example, the system further comprising a monitoring unit to monitor a total number of memory transactions having a high priority and to disable the prioritization function if the total number exceeds a threshold amount.

In an example, the core circuit includes multiple processing cores.

In an example, an apparatus comprises core circuit communicatively coupled to a memory, the core circuit comprising: a processing core; and a core gasket circuit to receive a memory transaction request from the processing core, the memory transaction request including source information identifying a source of the memory transaction request, the core gasket circuit further to determine and set a priority level of the memory transaction request based at least in part on the source information, the core gasket circuit further to send the memory transaction request with the priority level to the memory.

In an example, wherein the source information comprises an opcode identifying the source of the memory transaction request as one of a prefetch unit in the processing core and an execution pipeline in the processing core.

In an example, the core gasket circuit to assign a higher priority a memory transaction request from the execution pipeline than a memory transaction request from the prefetch unit.

In an example, wherein the source information is a logical processor identification.

In an example, the core circuit includes multiple processing cores.

In an example, a method comprises receiving a memory transaction request from a processing core, the memory transaction request including source information identifying a source of the memory transaction request determining and setting a priority level of the memory transaction request based at least in part on the source information; and sending the memory transaction request with priority information to a memory controller.

In an example, the source information comprises an opcode identifying the source of the memory transaction request as one of a prefetch unit in the processing core and an execution pipeline in the processing core.

In an example, the method further comprising assigning a memory transaction request from the execution pipeline a higher priority than a memory transaction request from the prefetch unit.

In an example, the source information comprises a logical processor identification.

In an example, the method further comprising receiving the memory transaction request with the priority information; and if a prioritization function is enabled, scheduling the memory transaction request with the priority information to be sent to the memory controller.

In an example, the method further comprising monitoring a number of prioritized transactions and disabling the prioritization function if the number exceeds a threshold amount.

In an example, a computer-readable storage medium including computer-readable instructions, when executed, to implement a method as described herein.

In an example, an apparatus comprising means to perform a method as described herein.

In an example, an apparatus comprises means for receiving a memory transaction request from a processing core, the memory transaction request including source information identifying a source of the memory transaction request; means for determining and setting a priority level of the memory transaction request based at least in part on the source information; and means for sending the memory transaction request with priority information to a memory controller.

In an example, the source information comprises an opcode identifying the source of the memory transaction request as one of a prefetch unit in the processing core and an execution pipeline in the processing core.

In an example, the apparatus further comprises means for assigning a memory transaction request from the execution pipeline a higher priority than a memory transaction request from the prefetch unit.

In an example, the source information comprises a logical processor identification.

In an example, the apparatus further comprises means for receiving the memory transaction request with the priority information; and if a prioritization function is enabled, means for scheduling the memory transaction request with the priority information to be sent to the memory controller.

In an example, the apparatus further comprises means for monitoring a number of prioritized transactions and means for disabling the prioritization function if the number exceeds a threshold amount.

Another example may include an apparatus comprising means to perform one or more elements of a method described in or related to any of examples herein, or any other method or process described herein.

Another example may include one or more non-transitory computer-readable media comprising instructions to cause an electronic device, upon execution of the instructions by one or more processors of the electronic device, to perform one or more elements of a method described in or related to any of examples herein, or any other method or process described herein.

Another example may include an apparatus comprising logic, modules, or circuitry to perform one or more elements of a method described in or related to any of examples herein, or any other method or process described herein.

Another example may include a method, technique, or process as described in or related to any of examples herein, or portions or parts thereof.

Another example may include an apparatus comprising: one or more processors and one or more computer readable media comprising instructions that, when executed by the one or more processors, cause the one or more processors to perform the method, techniques, or process as described in or related to any of examples herein, or portions thereof.

Another example may include a signal as described in or related to any of examples herein, or portions or parts thereof.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A system comprising:

a memory; and core circuit communicatively coupled to the memory, the core circuit comprising:

a processing core; and a prioritization circuit to receive a memory transaction request from the processing core, the memory transaction request including source information identifying at least a type of source of the memory transaction request, the prioritization circuit further to determine and set a priority level of the memory transaction request based at least in part on the source information, the prioritization circuit further to send the memory transaction request with the priority level to the memory.

2. The system of claim 1, wherein the source information comprises an opcode identifying the type of source of the memory transaction request as one of a prefetch unit in the processing core and an execution pipeline in the processing core.

3. The system of claim 2, wherein the prioritization circuit to assign a higher priority to a memory transaction request from the execution pipeline than a memory transaction request from the prefetch unit.

4. The system of claim 1, wherein the source information comprises a logical processor identification.

5. The system of claim 1 further comprising a memory controller to receive the memory transaction request with the priority level; and if a prioritization function in the memory controller is enabled, to schedule the memory transaction request with the priority level to be sent to the memory according to the priority level.

6. The system of claim 5, the memory controller comprising at least one queue and at least one arbitor, the at least one arbitor to schedule higher priority memory transaction requests to exit the queue before lower priority memory transaction requests.

7. The system of claim 6, the memory controller comprising multiple queues coupled serially, the memory controller to cause the higher priority memory transaction requests to by-pass one or more of the multiple queues.

8. The system of claim 5, further comprising a monitoring unit to monitor a total number of memory transactions having a high priority and to disable the prioritization function if the total number exceeds a threshold amount.

9. The system of claim 1, wherein the core circuit includes multiple processing cores.

10. An apparatus comprising:

a processing core; and a prioritization circuit to receive a memory transaction request from the processing core, the memory transaction request including source information identifying at least a type of source of the memory transaction request, the prioritization circuit further to determine and set a priority level of the memory transaction request based at least in part on the source information, the prioritization circuit further to send the memory transaction request with the priority level to the memory.

11. The apparatus of claim 10, wherein the source information comprises an opcode identifying the type of source of the memory transaction request as one of a prefetch unit in the processing core and an execution pipeline in the processing core.

12. The apparatus of claim 11, wherein the prioritization circuit to assign a higher priority a memory transaction request from the execution pipeline than a memory transaction request from the prefetch unit.

13. The apparatus of claim 10, wherein the source information is a logical processor identification.

14. A method comprising:

receiving a memory transaction request from a processing core, the memory transaction request including source information identifying at least a type of source of the memory transaction request;

determining and setting a priority level of the memory transaction request based at least in part on the source information; and sending the memory transaction request with priority information to a memory controller.

15. The method of claim 14, wherein the source information comprises an opcode identifying the type of source of the memory transaction request as one of a prefetch unit in the processing core and an execution pipeline in the processing core.

16. The method of claim 15, further comprising assigning a memory transaction request from the execution pipeline a higher priority than a memory transaction request from the prefetch unit.

17. The method of claim 14, wherein the source information comprises a logical processor identification.

18. The method of claim 14, further comprising receiving the memory transaction request with the priority information; and if a prioritization function is enabled, scheduling the memory transaction request with the priority information to be sent to the memory controller.

19. The method of claim 18, further comprising monitoring a number of prioritized transactions and disabling the prioritization function if the number exceeds a threshold amount.

* * * * *